United States Patent [19]

Lawson

[11] 4,319,773

[45] Mar. 16, 1982

[54] FASTENER AND DEVICES IN WHICH LOAD SUPPORTING MEMBERS ARE SECURED THEREBY

[75] Inventor: John E. Lawson, London, England

[73] Assignee: Armco Inc., Middletown, Ohio

[21] Appl. No.: 120,046

[22] Filed: Feb. 11, 1980

[51] Int. Cl.³ .............................................. F16L 39/00
[52] U.S. Cl. ............................... 285/137 A; 285/321; 403/261; 403/326
[58] Field of Search .................... 285/137 A, 321; 403/261, 326; 92/255, 256; 85/8.6–8.8; 151/38; 166/208, 212

[56] References Cited

U.S. PATENT DOCUMENTS

| 2,828,824 | 4/1958 | Comstock | 403/6 |
| 3,222,088 | 12/1965 | Haeber | 285/18 |
| 3,413,022 | 11/1968 | Waddell | 403/261 |
| 3,606,402 | 9/1971 | Medney | 285/305 |
| 4,073,511 | 2/1978 | Haas | 285/321 |
| 4,167,970 | 9/1979 | Cowan | 166/208 |

FOREIGN PATENT DOCUMENTS 1124542  4/1959  France .

Primary Examiner—William F. Pate, III
Attorney, Agent, or Firm—Roylance, Abrams, Berdo & Farley

[57] ABSTRACT

In devices, such as well tools, components which must support heavy loads are connected by a simple fastening device capable of transferring the heavy load from one component to the other, with the load being accepted by the fastening means in compression, and with the fastening means occupying only a small radial space.

16 Claims, 10 Drawing Figures

FASTENER AND DEVICES IN WHICH LOAD SUPPORTING MEMBERS ARE SECURED THEREBY

This invention relates to devices, typically well tools, in which heavy loads must be transferred from one supporting member to another, and to improved fastening means for connecting members to transfer such heavy loads.

RELATED APPLICATIONS

Subject matter disclosed herein is disclosed and claimed in my copending applications Ser. Nos. 120,047; 120,851 120,045, and 120,695, filed concurrently herewith.

BACKGROUND OF THE INVENTION

In a number of arts, prior-art workers have found it necessary to provide devices for supporting heavy loads, with the nature of the device being such that the load must be transferred between two members connected together by fastening means in such manner that the fastening means transfers the load from one member to the other. Such a need is commonly met, for example, in well tools used to run, orient and land long and very heavy strings of pipe or tubing. Many types of fastening means have been employed in such devices, including screw threads, latch dogs or segments, no-lead fixed segments brought into engagement by relative rotation, and piston-actuated locking rings or segments. Such prior-art devices have achieved success and are commonly used. However, the loads to be supported continually increase, as for example with the increasing depth of oil and gas wells now being drilled, and the amount of space available for the components of the device has tended to decrease, so that there has been an increasing need for improved fastening means in well tools and like devices.

OBJECTS OF THE INVENTION

A general object is to provide a device, such as a handling tool for use in completing oil and gas wells, wherein two members which are intended to support a very heavy load are connected together in an improved manner which affords greater load-carrying capability while requiring a minimum of space for the fastening means.

Another object is to provide such a device wherein one of the members to be connected is tubular and has a wall which is relatively thin in the context of the heavy load to be supported and wherein the tubular member is connected to another telescopically related member by a simple split ring which transfers the heavy load.

A further object is to devise an improved split ring for simply connecting two telescopically related members, the ring occupying a minimum space and yet having a very large load-supporting capability.

SUMMARY OF THE INVENTION

Broadly stated, devices constructed according to the invention comprise a first load-supporting member having a cylindrical surface interrupted by a transverse annular groove which has a frustoconical side wall; annular fastening means having an annular rib dimensioned to be accommodated by the groove and including a first frustoconical load-bearing surface, the fastening means having a second load-bearing surface parallel to the first load-bearing surface and facing away therefrom, and a cylindrical surface spaced radially from the rib and joining the second load-bearing surface in an annular corner, the fastening means being resiliently urged to engage the rib in the groove; a second load-supporting member connected to the first member by the fastening means and having a cylindrical surface telescopically engaged with the cylindrical surface of the fastening means, and a frustoconical load-bearing surface in flush engagement with the second load-bearing surface of the fastening means; and additional means engaged with the second member to restrain the first and second members from relative movement which would separate the frustoconical load-bearing surface of the second member from the second load-bearing surface of the fastening means. The load bearing surfaces are oriented to oppose the load to be transferred by the fastening means, and the load is transferred substantially entirely along lines substantially normal to the four frustoconical surfaces so that the forces applied to the fastening means act mainly in compression. Force components acting in shear and tending to overturn the annular fastening means are minimized.

In particularly advantageous embodiments, the fastening means is a split ring, and the invention includes the split ring as an article of manufacture.

IDENTIFICATION OF THE DRAWINGS

DETAILED DESCRIPTION OF THE INVENTION

Figure 1:
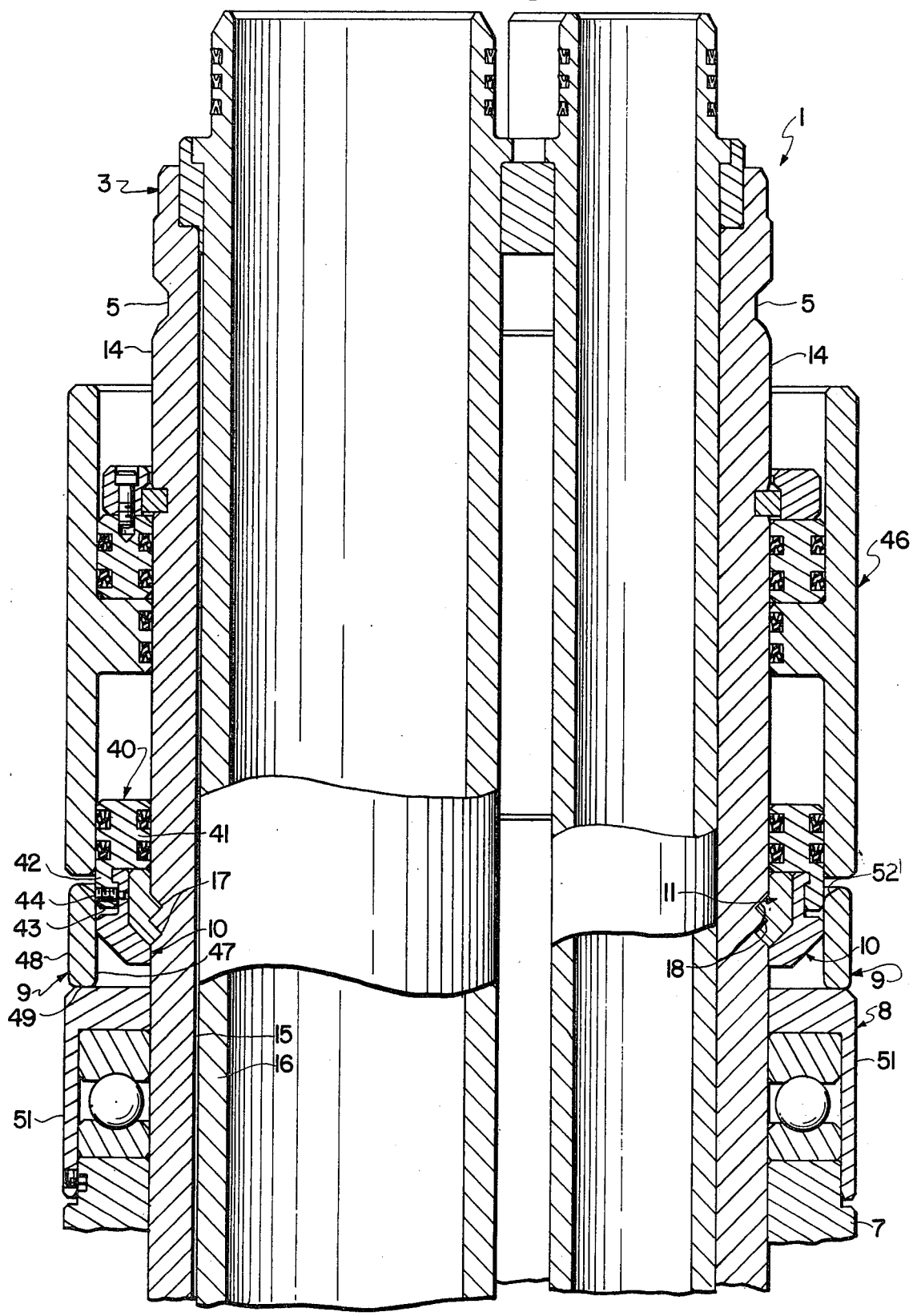
FIGS. 1, 1A and 1B are vertical sectional views illustrating a handling tool for running, orienting, landing and retrieving a tubing hanger and multiple strings of tubing, the handling tool including two embodiments of the invention.
Figure 1A:
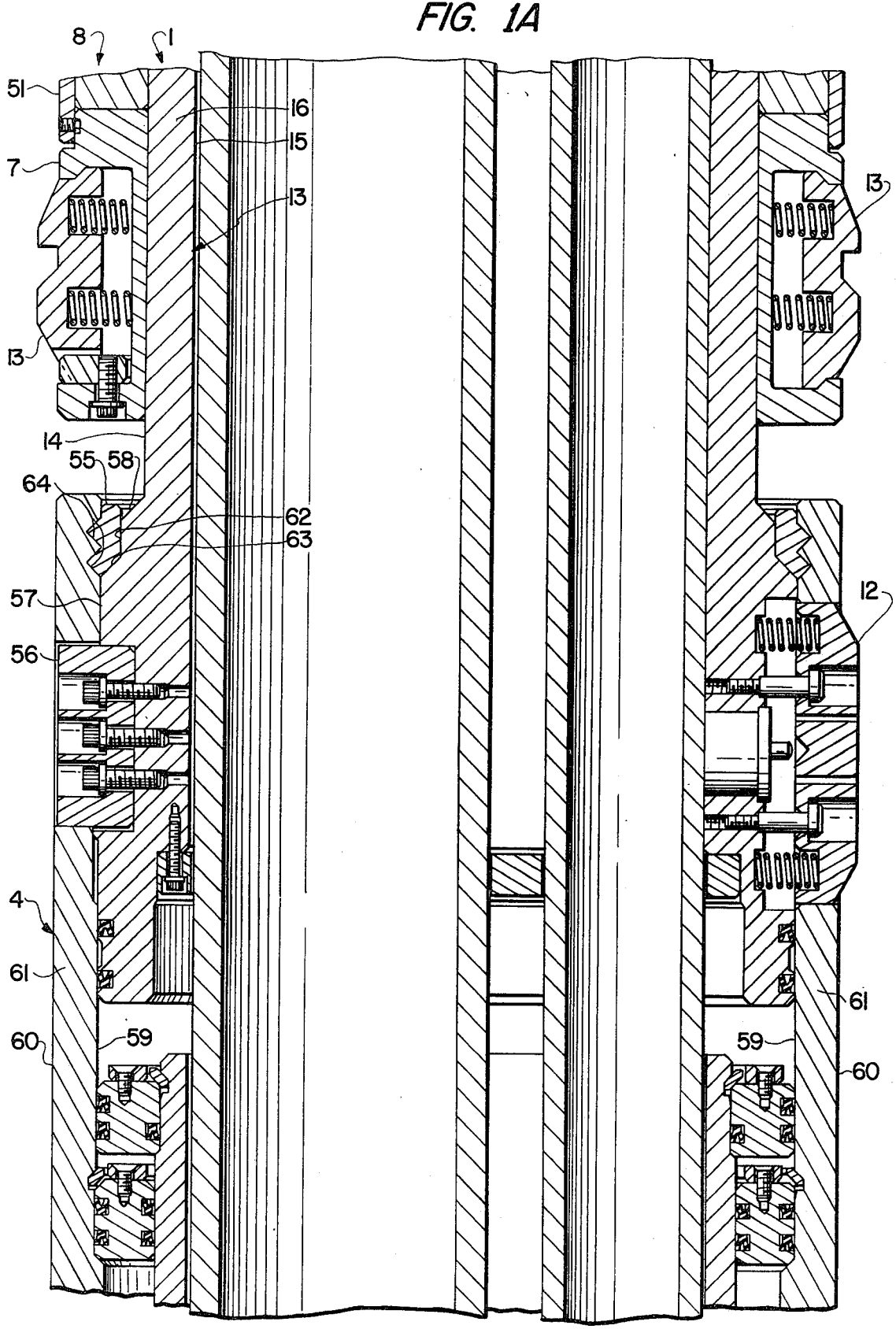
Figure 1B:
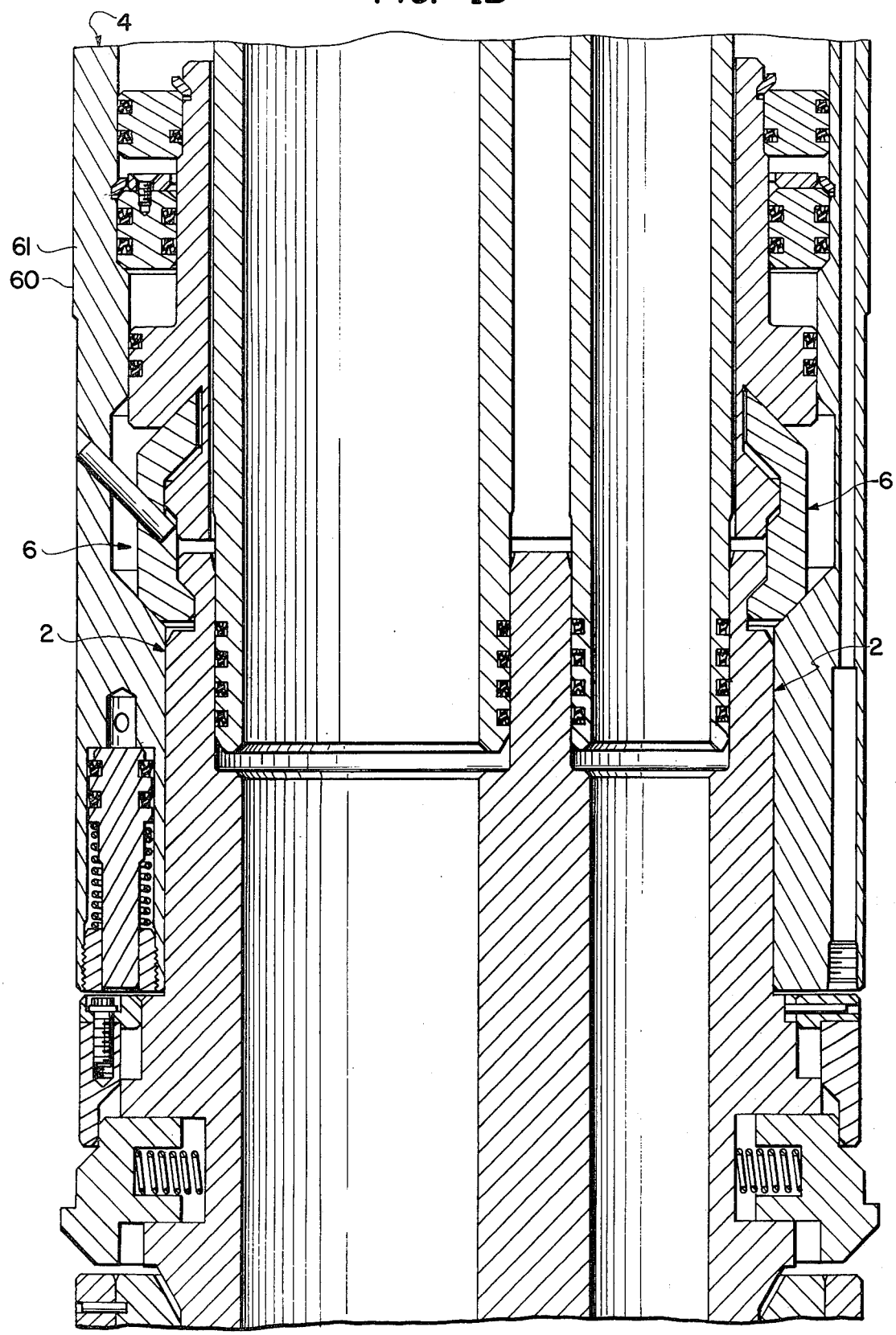

FIGS. 1–1B illustrate a multifunction handling tool, indicated generally at 1, which can be employed in conjunction with a handling string (not shown) to run, orient and land a tubing hanger 2, FIG. 1B, in an underwater well installation in the manner described and claimed in my copending application Ser. No. 120,047. Since the tubing hanger supports multiple strings of well tubing, which may be thousands of feet in length, the handling tool must support the very heavy load of the tubing strings during running, orienting and landing of the hanger.

Handling tool 1 has an elongated tubular body comprising an upper member 3 and a lower member 4, upper member 3 having an external groove 5, FIG. 1, for attachment of the tool to the handling string (not shown). Lower member 4 carries a remotely operated hydraulically actuated coupling, indicated generally at 6, FIG. 1B, by which tubing handger 2 is attached to the handling tool. Since the tubing hanger supports multiple strings of tubing disposed side-by-side, and since an upper component, typically a production upper body, must be installed after the handling tool is removed, the component having dependent stingers to engage in the multiple bores of the tubing hanger, it is necessary that the tubing hanger be oriented precisely to a predetermined rotational position before being landed. Tool 1 is therefore provided with a support collar 7, FIG. 1A, and releasable means comprising antifriction bearing 8, thrust ring 9, camming ring 10 and a split ring fastener 11, FIG. 1, for rotatably supporting the combination of tool 1, hanger 2 and the tubing on collar 7 while the tool is rotated to cause a locator key 12 to engage in a coating locator groove in the surrounding well member (not shown) which is typically the drilling upper body. As more fully described in my copending application Ser. No. 120,851, collar 7 has support segments 13 which are spring urged outwardly into a support groove (not shown) in the surrounding well member when the handling tool has been lowered to the proper position.

Figure 7:
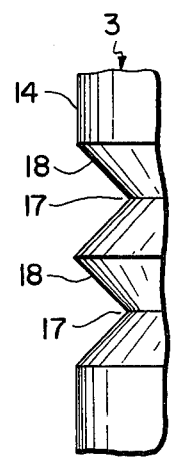
FIG. 7 is a fragmentary side elevational view of a grooved portion of the body of the tool shown in FIGS. 1–1B.

Upper body member 3 has a right cylindrical outer surface portion 14 and, in the area occupied by split ring fastener 11, a right cylindrical inner surface portion 15, these surface portions defining a tubular side wall portion 16 which is relatively thin when considered with reference to the great weight of the tubing strings to be supported. Outer surface portion 14 is interrupted by two transverse annular outwardly opening grooves 17. Grooves 17 are identical in size and shape, the radial cross section of each groove being in the form of an isosceles triangle with each groove 17 presenting a frustoconical upper side wall 18, FIG. 7, which tapers downwardly and inwardly at 45°. Grooves 17 are immediately adjacent to each other, so that the lower side wall of the upper groove joins the supper side wall of the lower groove in an annular corner which lies in the same right cylindrical plane as does surface portion 14.

Figure 6:
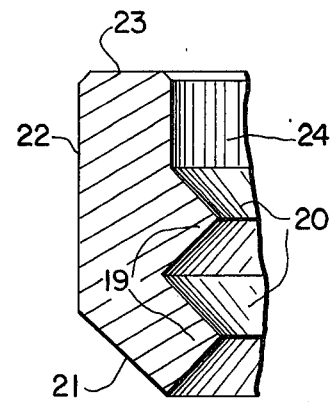
FIG. 6 is a radial sectional view taken generally on line 6—6, FIG. 3.

Ring 11 is an integral resilient metal piece having two annular ribs 19 on its inner surface, ribs 19 being identical, the radial cross section of each rib being in the form of an isosceles triangle identical to that of grooves 17. Thus, as best seen in FIG. 6, each rib 19 presents a frustoconical upper surface 20 which slants downwardly and inwardly at 45°. At its lower end, ring 11 has a frustoconical end surface 21 which tapers downwardly and inwardly at 45° and is therefore parallel to both surfaces 20. End surface 21 intersects the bottom surface of the lower one of ribs 19. Outer surface 22 of ring 11 is right cylindrical and extends upwardly from the outer edge of lower end surface 21 well beyond upper rib 19. Upper end surface 23 of the ring is a flat transverse annular face. A right cylindrical inner surface portion 24 extends from upper rib 19 to upper end face 23. Ribs 19 are immediately adjacent to each other so that the lower surface of upper rib 19 intersects the upper surface of lower rib 19 in an annular corner lying in the same right cylindrical plane as does surface 24. The radial distance between surfaces 22 and 24 is significantly greater than the radial height of ribs 19. Frustoconical surface 21 is therefore of such extent that not only will all lines passing at right angles through surface 20 of lower rib 19 also pass through surface 21 at right angles but also all lines passing at right angles through a substantial portion of surface 20 of the upper rib 19 will pass at right angles through surface 21.

Figure 3:
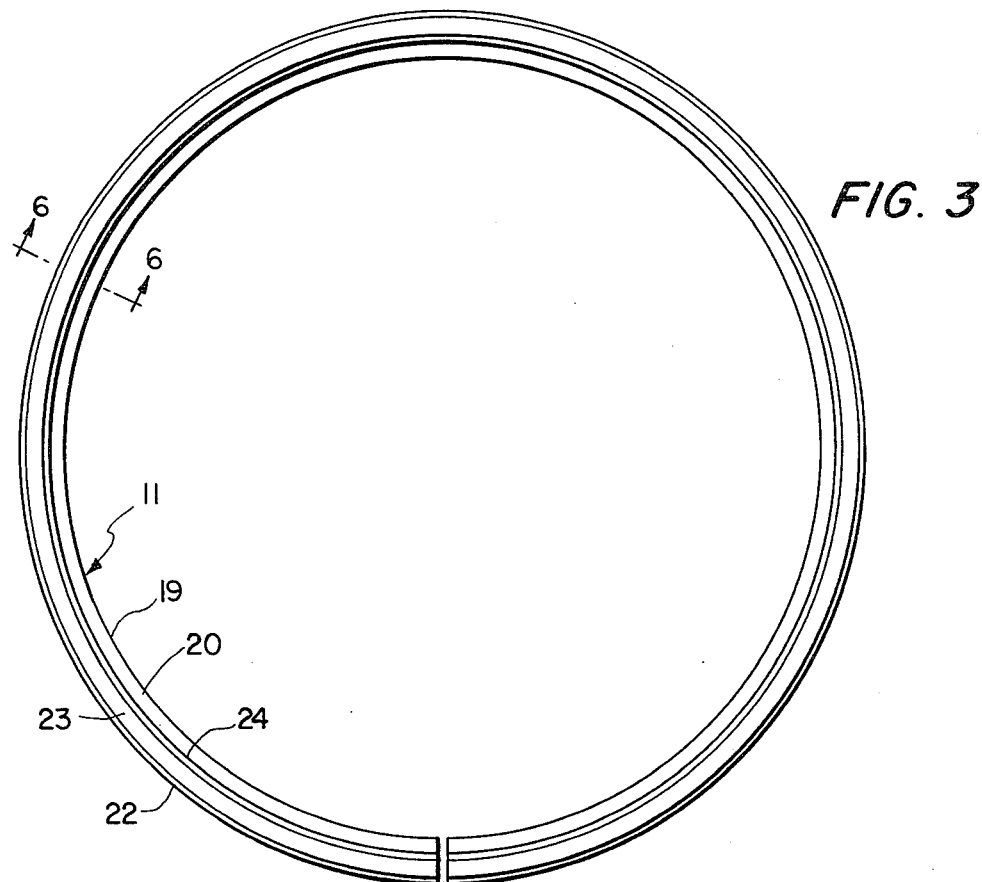
FIG. 3 is a top plan view of a split ring fastener according to the invention and employed in the structure illustrated in FIGS. 1 and 2.
Figure 4:
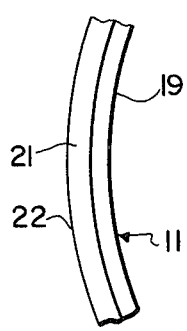
FIG. 4 is a fragmentary bottom plan view of the split ring of FIG. 3.
Figure 5:
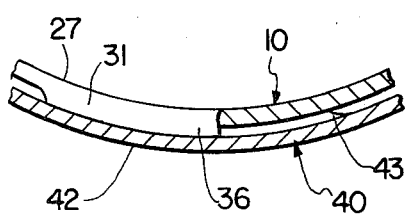
FIG. 5 is a fragmentary sectional view taken generally on line 5—5, FIG. 1.

Ring 11 can be machined as a full circle of such dimensions that surface 24 has the same diameter as does surface portion 14, and the ring is completed by providing a saw cut at 25, FIG. 3. Accordingly, the ring can be expanded, slipped over upper body member 3, and allowed to contract to bring ribs 19 into flush engagement with the respective grooves 17, the ribs thus being urged into and retained in the grooves by the inherent resiliency of the ring. With the ring thus installed, upper surfaces 20 of ribs 19 are in flush engagement with the respective upper side walls 18 of grooves 17.

Figure 8:
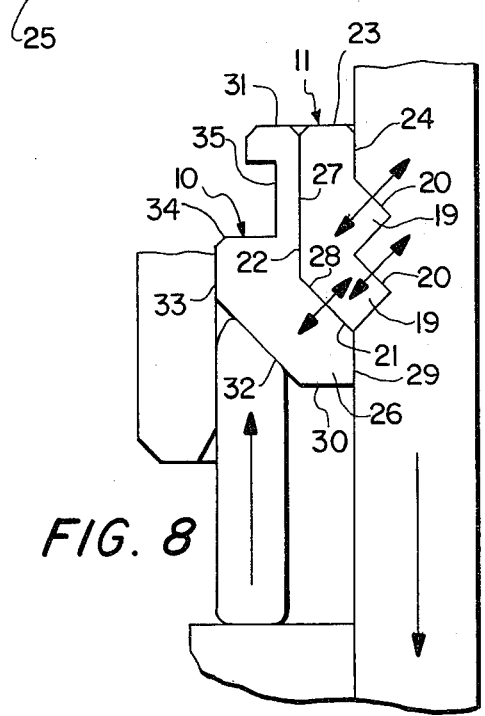
FIG. 8 is a semi-diagrammatic view illustrating the manner in which heavy loads are transferred by the split ring of FIG. 3.

Ring 11 is embraced by camming ring 10, FIGS. 1 and 8. Camming ring 10 is an integral full-circle piece having an upper right cylindrical inner surface portion 27 of a diameter such as to snugly embrace outer surface 22 of fastener ring 11 when the latter is relaxed. Surface portion 27 joins a frustoconical intermediate surface portion 28 which tapers downwardly and inwardly at 45° and in turn joins a lower right cylindrical surface portion 29 of a diameter to slidably embrace outer surface portion 14 of tool body portion 3. Ring 10 has flat transverse annular bottom and top end faces 30 and 31, respectively. The lower portion of ring 10 is radially relatively thick and includes a frustoconical surface portion 32, which slants downwardly and inwardly at 45°, the lower edge of surface portion 32 joining bottom end surface 30, the upper edge of surface portion 32 joining a right cylindrical outer surface portion 33. Outer surface portion 33 joins a flat transverse annular surface 34 which extends inwardly to join right cylindrical outer surface portion 35. At its upper end, ring 10 has four retainer ribs 36 which extend arcuately about the upper end of the ring and are equally spaced circumferentially. Ribs 36 project radially outwardly a short distance from surface 35.

Ring 10 cooperates with a seal ring 40, FIG. 1, comprising a main circular body 41, of rectangular radial cross section, and a dependent outer skirt 42 having four arcuate retaining ribs 43 spaced equally about the lower end of the skirt and projecting inwardly a short distance. The dimensions or skirt 42 and ribs 43 are such that ring 40 can be installed by passing ribs 43 between ribs 36 of ring 10 and then rotating one ring relative to the other to engage ribs 43 beneath ribs 36. With ring 40 thus installed, the lower end face of ring 40 engages upper end faces 23 and 31 of fastener ring 11 and ring 10, and the inner surface of the main body of ring 40 embraces surface portion 14 of tool body portion 3. A threaded radial bore is provided through one of the retainer ribs 43 of seal ring 40 to accommodate a threaded pin 44 and the tip of the pin is engaged in a bore in ring 10 to restrain the two rings against relative rotation. The main body of ring 40 is grooved to accommodate inner and outer elastomeric seals, as shown, so that a fluid-tight seal is established between surface portion 14 of tool body portion 3 and the inner surface of skirt 45 of annular piston 46.

Thrust ring 9 is a resilient split ring having, in its relaxed condition, right cylindrical inner and outer surfaces 47 and 48, respectively, the relaxed diameter of ring 9 being such that the ring can be aligned axially with frustoconical face 32 of ring 10. Ring 9 has a flat transverse annular bottom end face 49 adapted for flush engagement with the flat transverse annular upper end face 50 of the retainer 51 of bearing 8. The upper end face of ring 9 advantageously includes a frustoconical surface 52 which tapers downwardly and inwardly at 45° so as to be capable of flush engagement with face 32 of camming ring 10.

Figure 2:
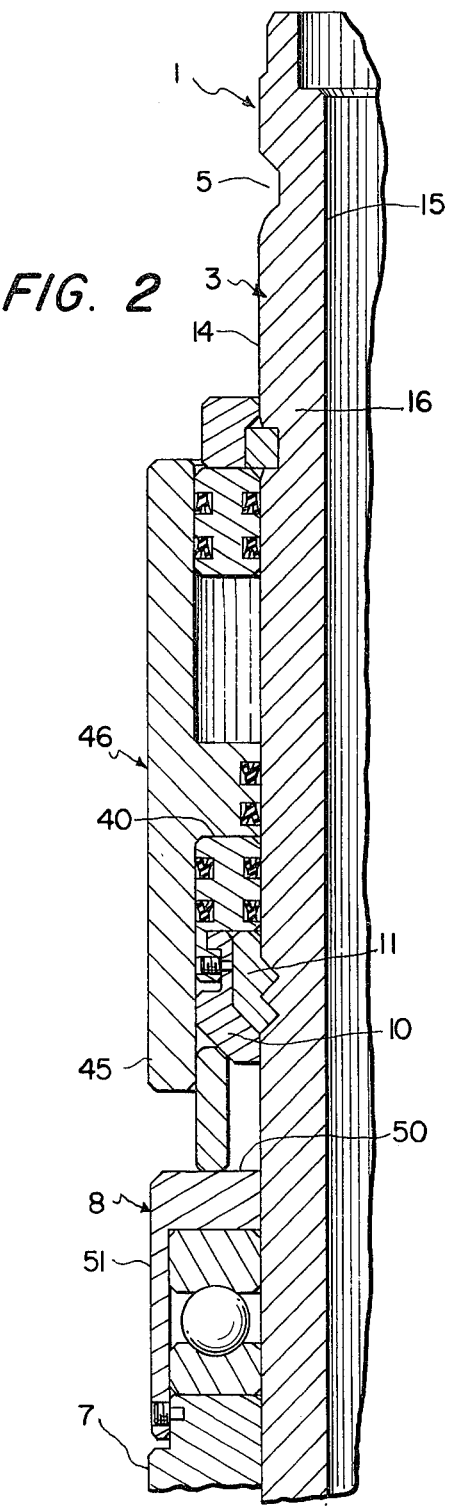
FIG. 2 is a fragmentary vertical sectional view showing relatively movable parts in different operative positions than in FIG. 1.

Preparatory to use of handling tool 1 to run the tubing hanger 2 and the strings of tubing depending from the hanger, thrust ring 9 is contracted and piston 46 is moved to its lowermost position, so that skirt 45 of the piston embraces ring 9 and holds ring 9 in the position seen in FIG. 2 with face 52 of the ring in flush engagement with surface 32 of ring 10. As the tubing hanger is run into the well, segments 13 of collar 7 engage in the cooperating groove provided, e.g., in the drilling upper body, and substantially the entire weight of the tubing strings and hanger is then supported by collar 7 via bearing 8, thrust ring 9, ring 10, fastener ring 11, and the body of handling tool 1, as seen in FIG. 2. When the handling tool has been rotated to cause locator key 12 to engage in the cooperating locator groove, piston 46 is actuated remotely to its upper position, seen in FIG. 1, freeing thrust ring 9 to expand outwardly so that the handling tool body can be lowered through ring 9, bearing 8 and collar 7 to land the tubing hanger. Thus, fastener ring 11 carries the load during rotational orientation of the handling tool but is freed of the load during the final landing operation.

During the time when piston 46 holds thrust ring 9 in its contracted position, any axial force tending to move handling tool 1 downwardly relative to support collar 7 is transferred to the combination of rings 10 and 9 via fastener ring 11 and the resulting load on ring 11 acts along the coincident normals indicated by the arrows in FIG. 8, i.e., along lines which are substantially at right angles to and substantially centered on the parallel load-bearing surfaces 18, 20, 21, 28, 32 and 52. Fastener ring 11 and camming ring 10 are thus loaded substantially entirely in compression, with substantially none of the load acting in shear. Since load-bearing surfaces 18, 20, 21, 28, 32 and 52 are all mutually parallel and since ring 11 is constrained radially between cylindrical surface 27 and the grooved outer surface of body member 3, there is essentially no effective force component tending to overturn the fastening ring. Accordingly, the dimensions of the fastening means can be minimized, so that grooves 17 in the relatively thin wall 16 of tool body portion 3 can, in the context of the large weight to be supported by member 3, be relatively shallow. In typical applications of the invention, the total weight to be carried by the handling tool may be as high as 300,000 lbs., and all of that weight must be transferred via fastening ring 11. Under those circumstances, if ring 11 has two ribs 19, the depth of grooves 17 need be only about ¼ inch and the fastening means is therefore easily accommodated by the relatively thin tubular wall 16.

Fastener rings according to the invention are resilient snap rings and can be biased inwardly, as in the case of ring 11, or outwardly, as in the case of ring 55, FIG. 1A. Ring 55 combines with a torque key 56 to secure the lower end of tool body member 3 within the upper end portion of tool body member 4. The lower end of member 3 is outwardly thickened to present a right cylindrical outer surface portion 57 joined to surface portion 14 by a frustoconical shoulder 58 which tapers upwardly and inwardly. The upper end portion of tool body member 4 is tubular, presenting a right cylindrical inner surface portion 59, which slidably embraces outer surface 57, and a right cylindrical outer surface portion 60 defining the relatively thin tubular wall 61. Tool body member 4 projects a short distance above the outer periphery of shoulder 58. At shoulder 58, the wall of body member 3 is annularly notched to provide a short right cylindrical outer surface portion 72 joining at its lower end a frustoconical shoulder 63 which tapers upwardly and inwardly at 45°. Ring 55 is essentially the same as ring 11 except that the two annular ribs 64 of ring 55 project outwardly to engage in two corresponding transverse annular inwardly opening grooves in wall 61. Since the weight of the tubing strings and hanger is suspended via tool body member 4, the tension load is applied via the upper walls of the grooves and upper 45° frustoconical surfaces of the ribs to the body of ring 55 and thus to tool body member 3 via the 45° frustoconical lower end face of the body of ring 55 and shoulder 63.

Torque key 56 is provided both to prevent relative rotation between tool body members 3, 4 and to prevent relative axial movement between the two body portions in a direction which would separate shoulder 63 from its flush engagement with the lower end face of ring 55. Key 56 is rectangular, secured to body member 3 by screws as shown, and projects outwardly through a rectangular opening in wall 61 of tool body member 4. The dimensions and dispositions of the key and rectangular opening are such that lower end face 65 of the key is in flush engagement with lower end wall 66 of the rectangular opening when the frustoconical lower end face of ring 55 is in flush engagement with shoulder 63. Thus, member 3 cannot move downwardly relative to member 4, nor can member 4 move upwardly relative to member 3. It will be apparent that ring 55 functions in the same manner as does ring 11 and that key 56 cooperates with ring 55 and members 3, 4 in generally the same manner as seal ring 40 cooperates with ring 11, member 3 and ring 10.

What is claimed is:
1. In a device in which large axial loads are to be transferred between two components of the device, the combination of
   a first load-supporting member having a cylindrical surface,
   said cylindrical surface having at least one transverse annular groove,
   one side wall of said groove being frustoconical and constituting a first load-bearing surface;
   a resilient split fastener ring comprising
   at least one annular rib having a second frustoconical load-bearing surface and being shaped and dimensioned to be accommodated by said groove,
   a third frustoconical load-bearing surface parallel to and facing away from said second load-bearing surface, and
   a cylindrical surface which is spaced radially from said rib, faces away from said rib and joins said third load-bearing surface in an annular corner,
   said ring being substantially relaxed and undistorted and having said rib engaged in said groove with said second frustoconical load-bearing surface in flush engagement with said first frustoconical load-bearing surface and with said third frustoconical load-bearing surface slanting away from said cylindrical surface of said first load-supporting member;

a second load-supporting member connected to said first load-supporting member by said split fastener ring, said second load-supporting member having a cylindrical surface telescopically engaged with said cylindrical surface of said fastener ring, and a fourth frustoconical load-bearing surface in flush engagement with said third frustoconical load-bearing surface; and additional means engaged with said second load-supporting member to prevent said first and second load-supporting members from being significantly moved telescopically relative to each other in a direction which would separate said fourth frustoconical load-bearing surface from said third frustoconical load-bearing surface.

2. The combination defined in claim 1, wherein said cylindrical surface of said first load-supporting member is an outer surface, said rib projects inwardly, and said cylindrical surface of said second load-supporting member is an inner surface.

3. The combination defined in claim 1, wherein said cylindrical surface of said first load-supporting member is an inner surface, said rib projects outwardly, and said cylindrical surface of said second load-supporting member is an outer surface.

4. The combination defined in claim 1, wherein said at least one annular rib is of triangular radial cross section so as to present an opposite frustoconical surface facing away from and tapering oppositely with respect to said second frustoconical load-bearing surface; and said third frustoconical load-bearing surface joins said opposite frustoconical surface in an annular corner.

5. The combination defined in claim 4, wherein said ring further comprises a second cylindrical surface concentric with the first-mentioned cylindrical surface of the ring, said second cylindrical surface joining said second frustoconical load-bearing surface in an annular corner, extending away therefrom and being telescopically engaged with the cylindrical surface of said first load-supporting member.

6. In a device in which large axial loads are to be transferred between two components of the device, the combination of a first load-supporting member having a cylindrical surface, said cylindrical surface having two transverse annular grooves, at least one side wall of each of said grooves being frustoconical and like frustoconical side walls of the two grooves being mutually parallel;

a resilient split fastener ring comprising two annular ribs each having a first frustoconical load-bearing surface, said first frustoconical load-bearing surfaces being mutually parallel and said ribs being dimensioned to be respectively accommodated by said grooves, a second frustoconical load-bearing surface parallel to and facing away from said first load-bearing surfaces, and a cylindrical surface spaced radially from said ribs and joining said second frustoconical load-bearing surface in an annular corner, said fastener ring being resiliently urged to engage said ribs respectively in said grooves with said first load-bearing surface of each rib being in flush engagement with said frustoconical wall of a different one of said grooves and said second load-bearing surface slanting away from said cylindrical surface of said first load-supporting member;

a second load-supporting member connected to said first load-supporting member by said fastener ring, said second load-supporting member having a cylindrical surface telescopically engaged with said cylindrical surface of said fastener ring, and a frustoconical load-bearing surface in flush engagement with said second load-bearing surface of said fastener ring; and additional means engaged with said second load-supporting member to prevent said first and second members from being significantly moved telescopically relative to each other in a direction which would separate said frustoconical load-bearing surface of said second load-supporting member from said second load-bearing surface of said fastener ring.

7. The combination defined in claim 6, wherein said ribs are of triangular radial cross section, the adjacent side surfaces of each adjacent pair of said ribs joining in an annular corner and the opposite side surface of one of said ribs joining said second load-bearing surface of said fastener ring in an annular corner, said annular corners lying in substantially the same right cylindrical plane; and each of said grooves is of triangular radial cross section and both side surfaces of each of said ribs are in flush engagement with the respective side walls of a different one of said grooves.

8. In a device in which large axial loads are to be transferred between two components of the device, the combination of a tubular first load-supporting member which, considering the magnitude of the load to be carried thereby, has a relatively thin wall, said first member having a cylindrical surface, said cylindrical surface having a plurality of transverse annular grooves, each of said grooves having a triangular radial cross section, and corresponding walls of said grooves being mutually parallel, one set of mutually parallel walls of said grooves constituting a set of frustoconical load-bearing surfaces;

annular fastening means comprising a plurality of ribs equal in number to said grooves, each of said ribs being of triangular radial cross section and engaged in a different one of said grooves, said ribs presenting a first set of mutually parallel frustoconical surfaces each in flush engagement with the frustoconical load-bearing surface of the groove in which the respective rib is engaged and a second set of mutually parallel frustoconical surfaces facing away from and tapering oppositely with respect to said first set of mutually parallel surfaces of said ribs, an additional frustoconical load-bearing surface parallel to and facing away from said first set of mutually parallel surfaces of said ribs, said annular fastening means being resiliently urged to maintain said ribs engaged in said grooves with said additional frustoconical load-bearing surface slanting away from said cylindrical surface of said first load-supporting member;

a second load-supporting member connected to said first load-supporting member by said annular fastening means, said second load-supporting member having a cylindrical surface telescopically engaged with said cylindrical surface of said fastening means, and a frustoconical load-bearing surface in flush engagement with said additional frustoconical load-bearing surface of said fastening means; and additional means engaged with said second load-supporting member to prevent said first and second load-supporting members from being significantly moved telescopically relative to each other in a direction which would separate said frustoconical load-bearing surface of the second load-supporting member from said additional frustoconical load-bearing surface of said fastening means.

9. The combination according to claim 8, wherein said additional means engaged with said second load-supporting member comprises a stop member fixed to one of said first and second load-supporting members and extending through an aperture in the other of said members.

10. The combination according to claim 9, wherein said first load-supporting member is an outer member and said cylindrical surface of said first load-supporting member is internal;

said second load-supporting member having an additional cylindrical surface which is of larger diameter than the cylindrical surface which is engaged with said annular fastening means, said additional cylindrical surface of said second load-supporting member being embraced by said internal surface of said first load-supporting member;

said stop member is fixed to said second load-supporting member and constitutes a key projection outwardly through the aperture in said first load-supporting member; and said key and the walls of said aperture coact to prevent relative rotation between said first and second load-supporting members as well as to prevent significant relative telescopic movement tending to separate said frustoconical load-bearing surface of said second load-supporting member from said additional load-bearing surface of said fastening means.

11. The combination defined in claim 8, wherein said first set of mutually parallel surfaces of said ribs, said additional frustoconical load-bearing surface of said fastening means, and said frustoconical load-bearing surface of said second load-supporting member all taper at an angle of approximately 45°.

12. In a device in which large axial loads are to be transferred between two components of the device, the combination of a first load-supporting member having a cylindrical surface, said cylindrical surface having at least one transverse annular groove, at least one side wall of said groove being frustoconical;

a resilient split fastener ring comprising at least one annular rib having a first frustoconical load-bearing surface, said rib being dimensioned to be accommodated by said groove, a second frustoconical load-bearing surface parallel to and facing away from said first load-bearing surface, an end surface opposite said second load-bearing surface, and a cylindrical surface spaced radially from said at least one rib, joining said second load-bearing surface in an annular corner, and extending toward said end surface, said resilient split fastener ring being disposed with said rib engaged in said groove with said first load-bearing surface in flush engagement with said frustoconical wall of said groove and said second load-bearing surface slanting away from said cylindrical surface of said first load-supporting member;

a second load-supporting member connected to said first load-supporting member by said fastener ring, said second load-supporting member having a cylindrical surface telescopically engaged with said cylindrical surface of said fastener ring, and a frustoconical load-bearing surface in flush engagement with said second load-bearing surface of said fastener ring; and an additional ring slidably engaged with said first load-supporting member and having an annular stop surface directed toward and engaged with said end surface of the fastener ring, said additional ring being connected to said second load-supporting member to prevent relative telescopic movement between said first and second load-supporting members in a direction which would separate said frustoconical load-bearing surface of said second load-supporting member from said second load-bearing surface of said fastener ring.

13. As an article of manufacture, an integral resilient metal split ring fastener having first and second end surfaces, and an inner surface and an outer surface, one of said inner and outer surfaces having an annular rib extending therealong and presenting a frustoconical load-bearing surface which tapers toward said first end surface, said one surface also including a right cylindrical surface portion which joins said frustoconical load-bearing surface and extends therefrom to said second end surface, the other of said inner and outer surfaces being right cylindrical and concentric with the right cylindrical surface portion of said one surface and extending to said second end surface, said first end surface being frustoconical, parallel to said load-bearing surface of said rib and facing away from said rib.

14. A split ring fastener according to claim 13, wherein said one of said inner and outer surfaces has a second annular rib extending therealong on the side of said first-mentioned rib which faces toward said first end surface, said ribs being of triangular radial cross section and said second rib presenting a first frustoconical surface which is parallel to the load-bearing surface of said first-mentioned rib, said second rib also presenting a second frustoconical surface which tapers oppositely with respect to the load-bearing surfaces of the ribs, said second frustoconical surface of said second rib joining said first end surface in an annular corner lying substantially in the cylindrical plane of said right cylindrical surface portion of said one surface.

15. A split ring fastener according to claim 14, wherein said second end surface comprises a flat annular surface lying in a plane transverse to the axis of the ring and substantially bridging the space between said right cylindrical surface portion of said one surface and said right cylindrical other surface.

16. A split ring fastener according to claim 15, wherein the radial distance between said right cylindrical surface portion of said one surface and said right cylindrical other surface is significantly greater than the radial height of said ribs; and said frustoconical first end surface joins said right cylindrical other surface in an annular corner.

* * * * *